(12) United States Patent
Prakash

(10) Patent No.: US 7,797,684 B2
(45) Date of Patent: Sep. 14, 2010

(54) AUTOMATIC FAILURE ANALYSIS OF CODE DEVELOPMENT OPTIONS

(75) Inventor: Raj Prakash, Saratoga, CA (US)

(73) Assignee: Oracle America, Inc., Redwood City, CA (US)

( * ) Notice: Subject to any disclaimer, the term of this patent is extended or adjusted under 35 U.S.C. 154(b) by 1008 days.

(21) Appl. No.: 11/267,111

(22) Filed: Nov. 4, 2005

(65) Prior Publication Data
US 2007/0169004 A1 Jul. 19, 2007

(51) Int. Cl.
*G06F 11/00* (2006.01)
*G06F 9/44* (2006.01)

(52) U.S. Cl. .................. 717/127; 717/131; 714/38; 714/45

(58) Field of Classification Search .................. 717/127, 717/131, 9, 125, 136, 130; 714/38, 45
See application file for complete search history.

(56) References Cited

U.S. PATENT DOCUMENTS

| | | | |
|---|---|---|---|
| 5,452,457 A | 9/1995 | Alpert et al. | |
| 5,675,803 A * | 10/1997 | Preisler et al. | 717/131 |
| 5,768,592 A | 6/1998 | Chang | |
| 5,905,855 A | 5/1999 | Klaiber et al. | |
| 5,937,191 A * | 8/1999 | Graham | 717/130 |
| 6,115,544 A | 9/2000 | Mueller | |
| 6,748,584 B1 * | 6/2004 | Witchel et al. | 717/136 |
| 6,785,848 B1 | 8/2004 | Glerum et al. | |
| 7,272,823 B2 | 9/2007 | Ball | |
| 2001/0032332 A1 * | 10/2001 | Ward et al. | 717/9 |
| 2002/0032901 A1 | 3/2002 | Chessin | |
| 2002/0108105 A1 | 8/2002 | Milobinski et al. | |
| 2002/0112098 A1 | 8/2002 | Halstead et al. | |
| 2002/0129338 A1 | 9/2002 | MacDonell | |
| 2002/0138226 A1 | 9/2002 | Doane | |
| 2003/0046671 A1 | 3/2003 | Bowen | |
| 2003/0121025 A1 | 6/2003 | Farchi et al. | |
| 2004/0133526 A1 | 7/2004 | Shmueli et al. | |
| 2005/0086633 A1 | 4/2005 | Nachmanson et al. | |
| 2005/0172271 A1 * | 8/2005 | Spertus et al. | 717/125 |
| 2006/0064676 A1 | 3/2006 | Chavan | |
| 2006/0236310 A1 * | 10/2006 | Domeika et al. | 717/140 |

OTHER PUBLICATIONS

Preliminary Amendment, U.S. Appl. No. 11/267,746, 11 pages, Dec. 14, 2005.
Non-Final Office Action, U.S. Appl. No. 11/267,746, 28 pages, Aug. 21, 2009.
Amendment and Response to Non-Final Office Action, U.S. Appl. No. 11/267,746, 14 pages, Nov. 12, 2009.

(Continued)

*Primary Examiner*—Hyung S Sough
*Assistant Examiner*—Carina Yun
(74) *Attorney, Agent, or Firm*—Gregory P. Durbin; Polsinelli Shughart PC

(57) ABSTRACT

Sweeping through the code development options of a code development command allows diagnosis of a failure resulting from execution of the code development command on a given code. Successively modifying the code development command, such as successively removing code development options, automatically allows efficient examination of a failure. Executing each modified version of the code development command and recording results of the executions generates information that can expeditiously identify correspondence between a failure and one or more of the code development options.

15 Claims, 17 Drawing Sheets

OTHER PUBLICATIONS

Preliminary Amendment, U.S. Appl. No. 11/267,113, 10 pages, Jan. 5, 2006.

Non-Final Office Action, U.S. Appl. No. 11/267,113, 18 pages, Apr. 3, 2009.

Amendment and Response to Non-Final Office Action, U.S. Appl. No. 11/267,113, 19 pages, Jun. 18, 2009.

Final Office Action, U.S. Appl. No. 11/267,113, 15 pages, Aug. 18, 2009.

Interview Summary, U.S. Appl. No. 11/267,113, 3 pages, Oct. 8, 2009.

Amendment and Response to Final Office Action, Application No. 11/267,113, 15 pages, Nov. 12, 2009.

Final Office Action, U.S. Appl. No. 11/267,111, 21 pages, Dec. 10, 2009.

Amendment and Response to Non-Final Office Action, U.S. Appl. No. 11/267,113, 14 pages, Feb. 18, 2010.

Final Office Action, U.S. Appl. No. 11/267,746, 14 pages, Mar. 3, 2010.

Amendment and Response to Non-Final Office Action, U.S. Appl. No. 11/267,746, 8 pages, Apr. 13, 2010.

* cited by examiner

• Log File

⦿ Sort by Number ◯ Sort by Runtime

Results for
/import/go-saraswati/rprak/demo/ats_mcf/pec.out

| Number | Compiler flags (Right click and save to download binary) | Status | Runtime |
|---|---|---|---|
| 1 | -xlinkopt=2 -fast | Verification Failed | 1.57 |
| 2 | -xO3 -xlinkopt=2 | Passed | 1.67 |
| 3 | -xO3 | Passed | 1.65 |

Web Browser
200

FIG. 2

Results for
/import/go-saraswati/rprak/demo/ats_mcf/pec.out

| Number | Compiler flags (Right click and save to download binary) | Status | Runtime |
|---|---|---|---|
| 1 | -xlinkopt=2 -fast | Verification Failed | 1.58 |
| 2 | -xlinkopt=2 -xO5 -fns -fsimple=2 -xmemalign=8s -xtarget=native -xlibmil -xlibmopt | Verification Failed | 1.57 |
| 3 | -xlinkopt=2 -xO5 -fns -fsimple=2 -xmemalign=8s -xtarget=native -xlibmil | Verification Failed | 1.59 |
| 4 | -xlinkopt=2 -xO5 -fns -fsimple=2 -xmemalign=8s -xtarget=native | Verification Failed | 1.59 |
| 5 | -xlinkopt=2 -xO5 -fns -fsimple=2 -xmemalign=8s | Verification Failed | 1.63 |
| 6 | -xlinkopt=2 -xO5 -fns -fsimple=2 | Verification Failed | 1.57 |
| 7 | -xlinkopt=2 -xO5 -fns -fsimple=1 | Passed | 1.56 |
| 8 | -xlinkopt=2 -xO5 -fns | Passed | 1.56 |
| 9 | -xlinkopt=2 -xO5 | Passed | 1.58 |
| 10 | -xlinkopt=2 -xO4 | Passed | 1.59 |
| 11 | -xlinkopt=2 -xO3 | Passed | 1.66 |
| 12 | -xO3 -xlinkopt=1 | Passed | 1.66 |
| 13 | -xO3 | Passed | 1.67 |

FIG. 4

- Log File

○ Sort by Number   ● Sort by Runtime

Results for
/home/rprak/mydemo/a.out

| Number | Compiler flags | Status | Runtime |
|---|---|---|---|
| 1 | -Wo,-max_fg=87 | Passed | 0.02 |
| 2 | -Wo,-max_fg=131 | Passed | 0.02 |
| 3 | -Wo,-max_fg=153 | Failed | 0.02 |
| 4 | -Wo,-max_fg=142 | Failed | 0.02 |
| 5 | -Wo,-max_fg=136 | Failed | 0.02 |
| 6 | -Wo,-max_fg=133 | Failed | 0.02 |
| 7 | -Wo,-max_fg=132 | Failed |  |

Web Browser
700

FIG. 7

Results – Web Browser

- Log File
- ○ Sort by Number  ○ Sort by Runtime

Results for /home/rprak/mydemo/a.out

| Number | Compiler flags | Status | Runtime |
|---|---|---|---|
| 1 | -Wo,-skip_fg=66 -Wo,-max_fg=132 | Passed | 0.02 |
| 2 | -Wo,-skip_fg=33 -Wo,-max_fg=132 | Passed | 0.03 |
| 3 | -Wo,-skip_fg=16 -Wo,-max_fg=132 | Failed | 0.03 |
| 4 | -Wo,-skip_fg=24 -Wo,-max_fg=132 | Failed | 0.03 |
| 5 | -Wo,-skip_fg=28 -Wo,-max_fg=132 | Failed | 0.03 |
| 6 | -Wo,-skip_fg=30 -Wo,-max_fg=132 | Failed | 0.03 |
| 7 | -Wo,-skip_fg=31 -Wo,-max_fg=132 | Passed | 0.02 |

Web Browser
900

FIG. 9

- Log File
- Faulty Module

○ Sort by Number  ○ Sort by Runtime

Results for /home/rprak/mydemo/dual.out

| Number | Compiler flags | Status | Runtime |
|---|---|---|---|
| 1 | -xO4 -WO,-pec keep,ATS/run/pass | Passed | 0.73 |
| 2 | -fast -WO,-pec keep,ATS/run/fail | Failed | 0.76 |
| 3 | -xO4 -WO,-pec use,ATS/run/fail,8,14 -WO,-pec use,ATS/run/pass,1,7 | Failed | 0.75 |
| 4 | -xO4 -WO,-pec use,ATS/run/fail,11,14 -WO,-pec use,ATS/run/pass,1,10 | Failed | 0.74 |
| 5 | -xO4 -WO,-pec use,ATS/run/fail,13,14 -WO,-pec use,ATS/run/pass,1,12 | Failed | 0.73 |
| 6 | -xO4 -WO,-pec use,ATS/run/fail,14,14 -WO,-pec use,ATS/run/pass,1,13 | Passed | 0.75 |
| 7 | -xO4 -WO,-pec use,ATS/run/fail,13,14 -WO,-pec use,ATS/run/pass,1,12 | Failed | 0.74 |
| 8 | -xO4 -WO,-pec use,ATS/run/fail,1,14 -WO,-pec use,ATS/run/pass,13,13 | Failed | 0.75 |
| 9 | -xO4 -WO,-pec use,ATS/run/fail,8,14 -WO,-pec use,ATS/run/pass,1,7 -WO,-pec use,ATS/run/pass,13,13 | Failed | 0.73 |
| 10 | -xO4 -WO,-pec use,ATS/run/fail,11,14 -WO,-pec use,ATS/run/pass,1,10 -WO,-pec use,ATS/run/pass,13,13 | Failed | 0.72 |
| 11 | -xO4 -WO,-pec use,ATS/run/fail,13,14 -WO,-pec use,ATS/run/pass,1,12 -WO,-pec use,ATS/run/pass,13,13 | Passed | 0.72 |
| 12 | -xO4 -WO,-pec use,ATS/run/fail,12,14 -WO,-pec use,ATS/run/pass,1,11 -WO,-pec use,ATS/run/pass,12,12 | Failed | 0.72 |
| 13 | -xO4 -WO,-pec use,ATS/run/fail,1,14 -WO,-pec use,ATS/run/pass,13,13 -WO,-pec use,ATS/run/pass,12,12 | Passed | 0.75 |

Web Browser
1000

FIG. 10

```
global_opt()                                                global_opt()
    call    (net+180)                                           call    (net+180)
    add     %i4, 0x0, %o0                                       add     %i4, 0x0, %o0
    ret                                                         ret
    restore %g0, 0x0, %o0                                       restore %g0, 0x0, %o0
    illtrap 0x0                                                 illtrap 0x0
...
    fcmpes  %fcc2, %f24, %f22                                   fcmpes  %fcc2, %f28, %f26
    fmovsg  %fcc2, %f24, %f28                                   fmovsg  %fcc2, %f28, %f1
    fstod   %f28, %f30                   ——⟩                    fstod   %f1, %f32
    sethi   %hi($XBsNEkBW5UbCWuM.global_opt..L468)  ⟩           sethi   %hi($XBsNEkBW5UbCWuM.global_opt..L4
    ldd     [%i4 + $XBsNEkBW5UbCWuM.global_opt..L46 ⟩           ldd     [%i3 + $XBsNEkBW5UbCWuM.global_opt.
    fcmpd   %fcc3, %f30, %f42                                   fcmpd   %fcc3, %f32, %f42
    fbne,pn %fcc3, (net+388)             —⟨⟨⟨⟨                  fbne,pn %fcc3, (net+392)
    sethi   %hi($XBsNEkBW5UbCWuM.global_opt..L468)              sethi   %hi($XBsNEkBW5UbCWuM.global_opt..L4
    ld      [%i5 + $XBsNEkBW5UbCWuM.global_opt..L46             ld      [%i4 + $XBsNEkBW5UbCWuM.global_opt.
    ret                                  ——                     ret
    restore                                                     restore
    fdivs   %f26, %f28, %f0                                     sethi   %hi(0x0), %i5
    std     %f30, [%sp + 0x68]                                  std     %f32, [%sp + 0x68]
...
```

FIG. 12

AUTOMATIC FAILURE ANALYSIS OF CODE DEVELOPMENT OPTIONS

BACKGROUND

1. Field of the Invention

The described invention relates to the field of code analysis, and, more specifically, to the field of code failure analysis.

2. Description of the Related Art

Code authors/editors, such as independent software vendors (ISVs), application developers, technical consultants, other engineers, etc., invest vast amounts of time trying to improve the performance of software. The code authors/editors typically test increasing levels of optimization to gain the most performance optimization for a given piece of software. Unfortunately, the employment of increasing levels of optimization are not always successful. Errors in the code (e.g., uninitialized variables) that may not have previously affected execution prior to application of a code development option, are now exposed by utilization of the code development option (e.g., compiler flag). Instead of or in addition to errors in code, a code development tool may have an error. Discovering these errors in either or both of code and a code development tool is tedious and difficult, especially in larger code. Typically, a code editor/author cannot afford to expend the resources to investigate such errors and instead accepts a version of the code processed by a code development tool without the problematic options, thus foregoing the benefits offered by the options and, most likely, higher level options.

SUMMARY

It has been discovered that automatically selecting subsets of a set of code development options and successively applying the different selected subsets to a code allows efficient investigation of an incompatibility between a code and one or more code development options. The result of each successive execution of different subsets of code development options can be recorded and then analyzed to discover those code development options that cannot be successfully applied to a given code.

These and other aspects of the described invention will be better described with reference to the Description of Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 2 depicts a web browser with example results of code development option failure analysis.

FIG. 4 depicts a web browser with example results of failure analysis that analyzes constituent options of macro-code development options and different levels of a multiple level code development option.

FIG. 7 depicts a web browser with example failure analysis results for threshold failure analysis.

FIG. 8A depicts an example flowchart for threshold failure analysis of an implicit range of values for a code development option. FIG. 8B depicts an example flowchart for failure analysis of a specified subrange of values for a code development option.

FIG. 9 depicts a web browser with example recorded results of a threshold failure analysis for a specified subrange.

FIG. 10 depicts a web browser presenting example recorded results of module search failure analysis.

FIG. 11A depicts an example flowchart for module search failure analysis.

FIG. 11B depicts continuation of the example flowchart depicted in FIG. 11A.

FIG. 12 depicts an example decomposition of two versions of a portion of a module.

FIG. 13A depicts an example of the example system accepting code and code development options from over a network cloud 1305. FIG. 13B depicts the example system returning a failure analysis result(s).

The use of the same reference symbols in different drawings indicates similar or identical items.

DESCRIPTION OF EMBODIMENT(S)

The description that follows includes exemplary systems, methods, techniques, instruction sequences and computer program products that embody techniques of the present invention. However, it is understood that the described invention may be practiced without these specific details. For instance, many of the examples refer to a binary search technique even though other search techniques, such as linear search, hash, etc., may be utilized. In other instances, well-known protocols, structures and techniques have not been shown in detail in order not to obscure the invention.

The following description refers to the terms code development option, code development command, sweeping, and module. A code development command is a command entered into a code development tool to cause one or more tasks to be performed on one or more units of code by the code development tool. Examples of a code development tool include a compiler, an optimizer, an interpreter, etc. Typically, a code development command comprises multiple code development options, although multiple code development options are not necessary. Each code development option causes a code development tool to perform a different set of one or more tasks. For a compiler, the code development options are referred to as compiler flags. In addition, the term "sweeping" is utilized herein to refer to iteratively modifying a code development command and executing each of the resulting modified code development commands. The term module refers to a portion of code that implements or performs a particular function or task (e.g., compute a sum, sort a data structure, etc.), perhaps returning or generating a result. Although modules are typically defined by the particular function or task performed, code authors/editors may compose a module that performs multiple functions or tasks.

Figure 13A:
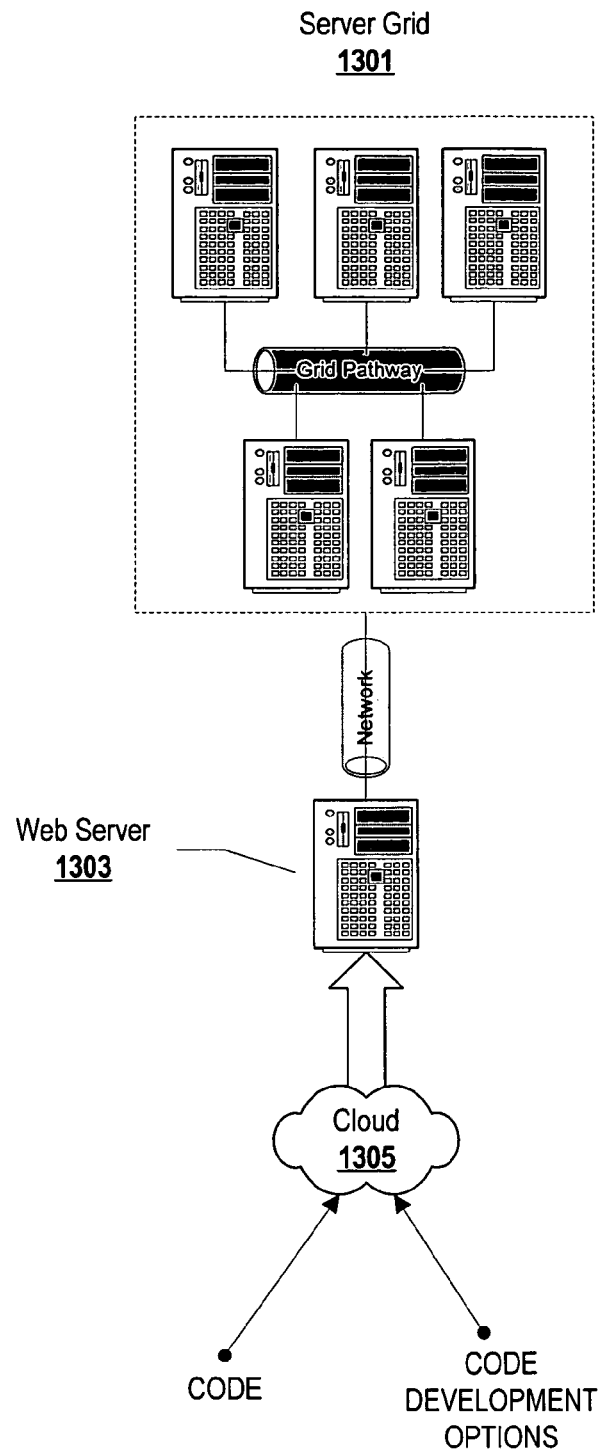
FIGS. 13A-13B depict example systems for applying failure analysis techniques to code.
Figure 13B:
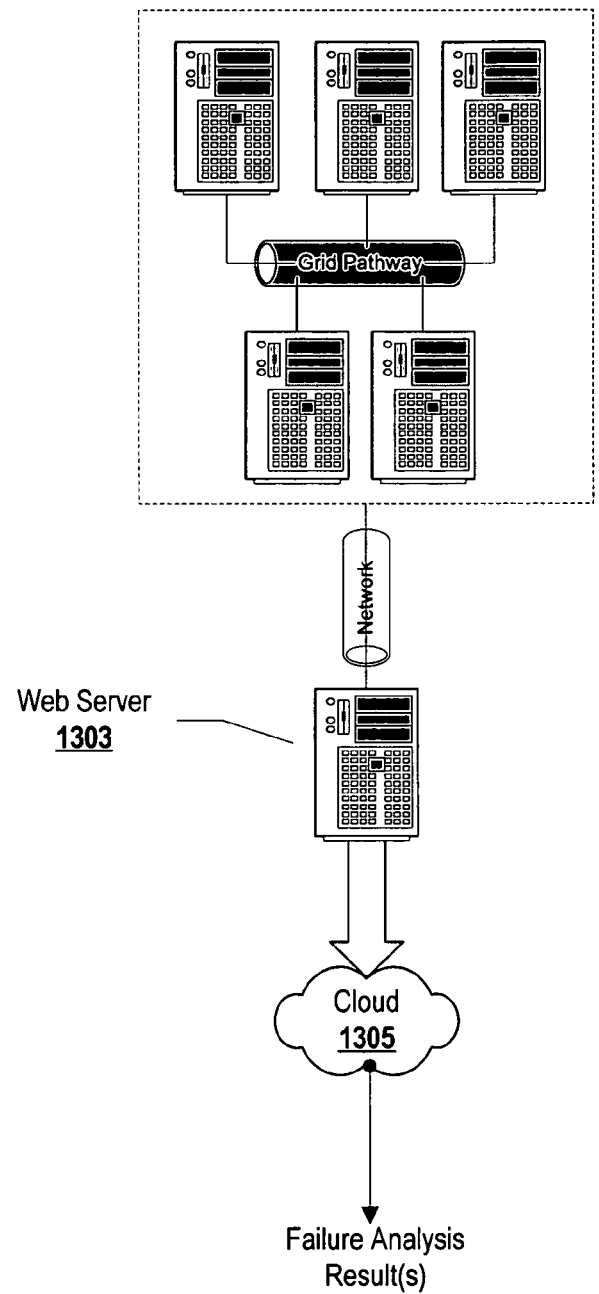

FIGS. 13A-13B depict example systems for applying failure analysis techniques to code. FIG. 13A depicts an example of the example system accepting code and code development options from over a network cloud 1305. The code can be any type of source code, such as code written in C++, the Java™ programming language, Python, etc. The code may also be a portable executable representation of a source code. An intermediate representation with information sufficient to convey initial code development options and sufficient for generation of another executable representation is embedded within a portion of the executable representation of the source code. The code development options are those problematic options that were employed to execute a code development command on a code development tool for the code. For example, the code development options may be options entered into a compiler, interpreter, optimizer, etc. The code and the code development options are transmitted over a network via a cloud 1305 to a web server 1303. The web server 1303 is coupled with a server grid 1301, which includes a plurality of servers (e.g., blade servers, racks, etc.), which are communicatively coupled via a grid pathway (e.g., Ethernet network, communication bus, etc.). A service provider may own the web server 1303 and/or the grid 1301. Code authors/editors submit their code to the service provider for failure analysis, and perhaps, code tuning. The web server 1303 forwards the received code and code development options to the server grid 1301. The particular division of labor between the web server 1303 and the server grid 1301 may vary among embodiments. For example, the web server 1303 may invoke a failure analysis tool resident within the server grid 1301 to examine the code with the code development options. In another example, the web server 1303 installs the code and code development options in a queue that feeds the server grid 1301. In another example, an application, such as a cgi program, is resident on the web server 1303 and diagnoses the cause of the problem, without having to utilize a server farm, grid, or other separate private machine.

FIG. 13B depicts the example system returning a failure analysis result(s). After the code and code development options have been examined with the failure analysis tool(s) by the server grid 1301, the web server 1303 receives the result(s) and transmits them over the network cloud 1305. The failure analysis result(s) may be transmitted in accordance with a variety of protocols (e.g., TCP/IP, PPPoE, tunnels, etc.) and presented in accordance with any one of a web browser, FTP utility, etc.

Failure Analysis of Code Development Options

Figure 1:
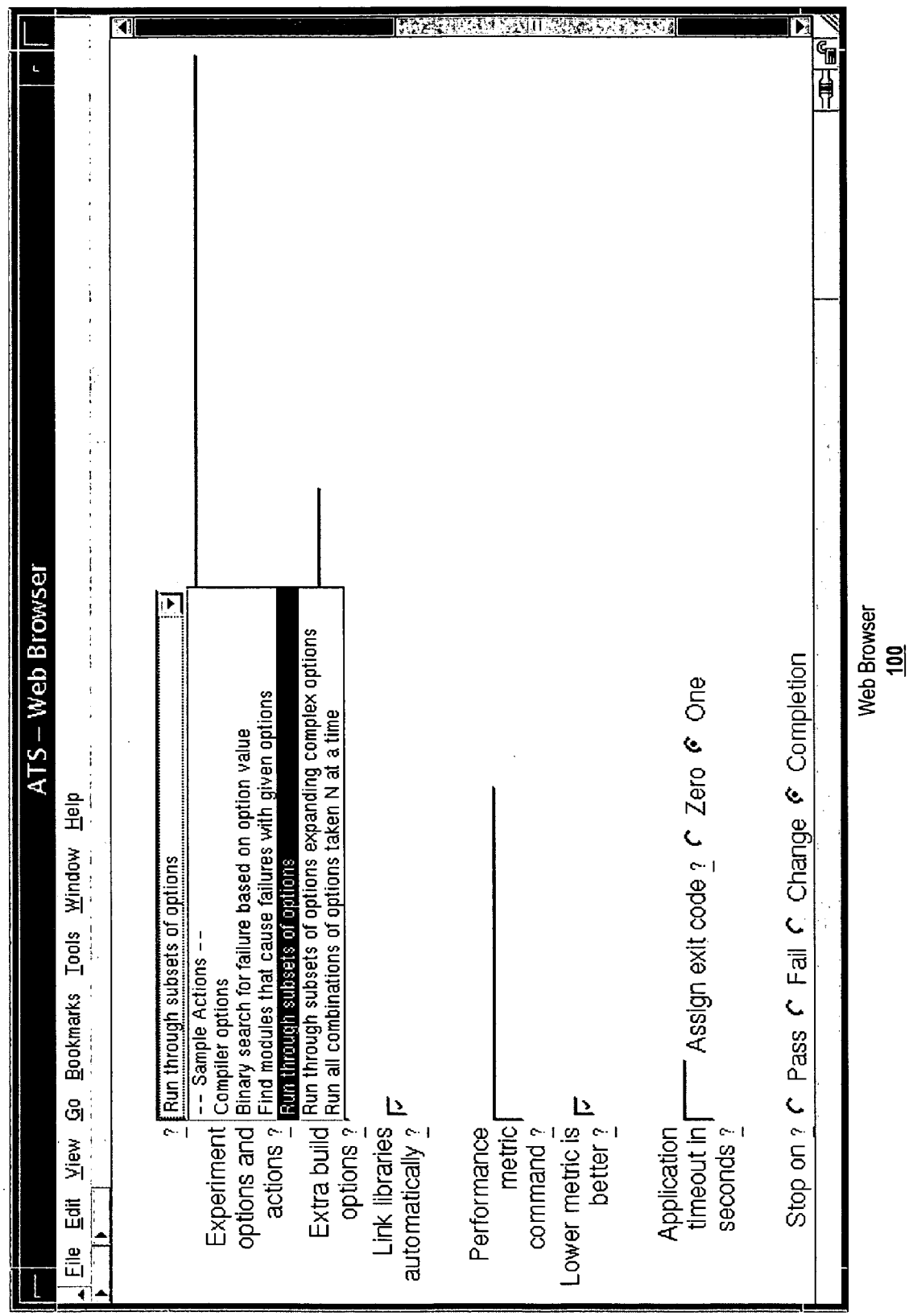
FIG. 1 depicts an example of a web browser that accepts selection of a failure analysis technique from a drop-down menu.

FIG. 1 depicts an example of a web browser that accepts selection of a failure analysis technique from a drop-down menu. The web browser 100 drop-down menu indicates five different failure analysis techniques: "binary search for failure based on option value," "Find modules that cause failures with given options," Run through subsets of options," "Run through subsets of options expanding complex options," and "Run all combinations of options taken N at a time." The web browser 100 includes additional fields for accepting input from a user, such as fields related to automatic code tuning. The web browser 100 can be implemented with any of a variety of browser implementations. Embodiments may utilize other techniques for accepting input, such as a command line interface. In addition, a drop-down menu is only an example mechanism for accepting input from a user. Input may be accepted with radio buttons, text input, image map, etc. The input accepted by the web browser 100 also includes indication of a location of code. With the location, the code is located and transmitted to a provider of failure analysis services. For example, a user indicates the code and code development option in the web browser 100 of FIG. 1, and the web browser conveys the input to a server, such as the web server 1303 depicted in FIGS. 13A and 13B.

FIG. 2 depicts a web browser with example results of code development option failure analysis. The web browser 200 indicates results of sweeping through a code development command "xlinkopt=2-fast." The web browser 200 presents the results with three rows of code development options, one row for each run of code development options. The first row indicates a first code development command that was executed on a code "pec.out." The code development command comprises the set of code development options -xlinkopt=2 and -fast. The results displayed in the web browser indicate that execution of this first command failed verification and had a runtime of 1.57 seconds. Although variations can be implemented, the indications of the code development options in the web browser 100 are selectable indications (e.g., HTML hyperlinks) that link to corresponding code (i.e., the code generated from execution of the code development command). The second row indicates a second code development command with a subset of the code development options from the first code development command. The second code development command comprises code development options -xO3 and -xlinkopt=2, which is a subset of the code development options of the first code development command. Execution of this second code development command passed verification and had a runtime of 1.67. Of note, the second code development command includes the code development option -xO3, which was not in the first development command, because the example results are based on an example code development tool that uses information recorded with the option -xO3 (or higher, such as -xO4, -xO5, etc.). Since the option -xO5 is a constituent of the removed option -fast, the option -xO3 must be inserted, in this example, to provide information required by the example code development tool. Of course, those of ordinary skill in the art will appreciate that other code development tools can be utilized that do not require information recorded with this option. Even though the option -xO3 is not a constituent option, the second and third code development commands are derived from the failed code development command. The third row indicates a third code development command that only includes the code development option -xO3. The results indicate that the third code development command passed verification, and had a runtime of 1.65 seconds. With this information, a user (e.g., code author, code editor, code tester, etc.) can determine that the -fast option and the code pec.out are incompatible. A developer could use this information to further examine the interaction between this failing option and the code, simply decide to exclude the -fast option, consult the owner of the code development tool, etc.

Figure 3:
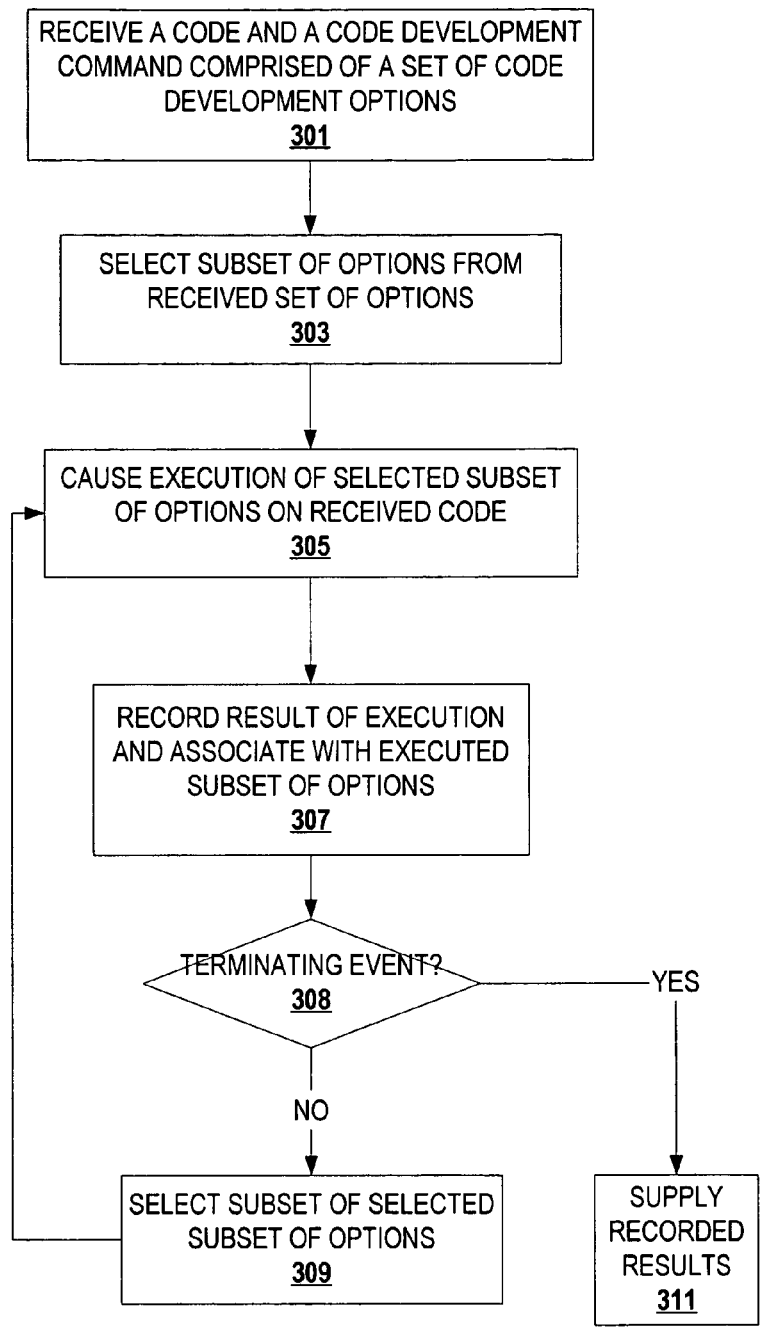
FIG. 3 depicts an example flowchart for dynamic failure analysis of subsets of code development options.

FIG. 3 depicts an example flowchart for dynamic failure analysis of subsets of code development options. At block 301, a code and a code development command comprised of a set of code development options is received. At block 303, a subset of the received set of code development options is selected. At block 305, the selected subset of code development options are caused to be executed on the received code. For example, the selected subset of options are passed to a tool, a tool is invoked with the selected set of options, etc. At block 307, a result of the execution is recorded and the recorded result is associated with the selected subset of code development options. At block 308, it is determined whether a terminating event is encountered. For example, it is determined whether an analysis limit has been reached and/or the final option or final subset of code development options has been selected. For example, a tool may allow configuration of a maximum number of executions or runs to be performed with the code and the code development option subsets. An analysis limit can be realized as an execution limit, a resource limit (e.g., maximum processor time), etc. The final subset of code development options or final code development option would be the last subset of one or more code development options that can be executed on the code within the parameters of the corresponding code development tool. For example, although three of an initial eight options may remain, a compiler or optimizer may not allow execution of a code development command with a smaller subset of the last three particular code development options. Embodiments may also use a combination of the two terminating events, such as assigning a weight to an analysis limit and assigning a greater weight to the event of arriving at the final code development option subset.

If a terminating event is not encountered, then control flows to block 309. At block 309, a subset of the selected subset of code development options is selected. Control flows from block 309 back to block 305. If a terminating event is not encountered, then control flows to block 311. At block 311, the recorded results of the failure analysis are supplied. For example, the recorded results are supplied to another tool or application that transforms the results for presentation via a web browser or other user interface.

Some code development options have multiple levels or are macro-code development options. A more involved analysis can be performed for code development commands that include such code development options. A more substantive analysis examines the different levels of a multiple-level code development option or the constituent options of a macro-code development option.

FIG. 4 depicts a web browser with example results of failure analysis that analyzes constituent options of macro-code development options and different levels of a multiple level code development option. When a macro-option is encountered, the failure analysis tool expands the macro-option into its constituent options and selects subsets of the constituent options. When a multiple-level code development option is encountered, the failure analysis tool successively selects for examination the different levels. The web browser 400 indicates 13 rows of recorded results. A first row indicates the code development command "−xlinkopt=2−fast". As in FIG. 2, the execution of this first row command results in a failure with a runtime of 1.58 seconds. Instead of removing the last option, the second run of failure analysis replaces the −fast option with all of its constituent options. Execution of the code development command with the constituent options results in a failure and a runtime of 1.57 seconds. The next run of failure analysis executes a code development command without the −xlibmopt option, still resulting in failure. The runs continue to peel off options until finally achieving a successful execution with the code development options "−xlinkopt=2−xO5−fns−fsimple=1". The transition from failure to success occurs after −fsimple=2 is replaced with −fsimple=1. The subsequent runs with selected subsets of code development options continue to result in successful executions with the code. As illustrated with FIG. 4, incompatibilities between a given code and a code development option can be efficiently identified without sacrificing the benefits of other code development options. With these recorded results, a developer can identify the transition from failure to success and more precisely select successful code development options to be applied to a code.

Figure 5:
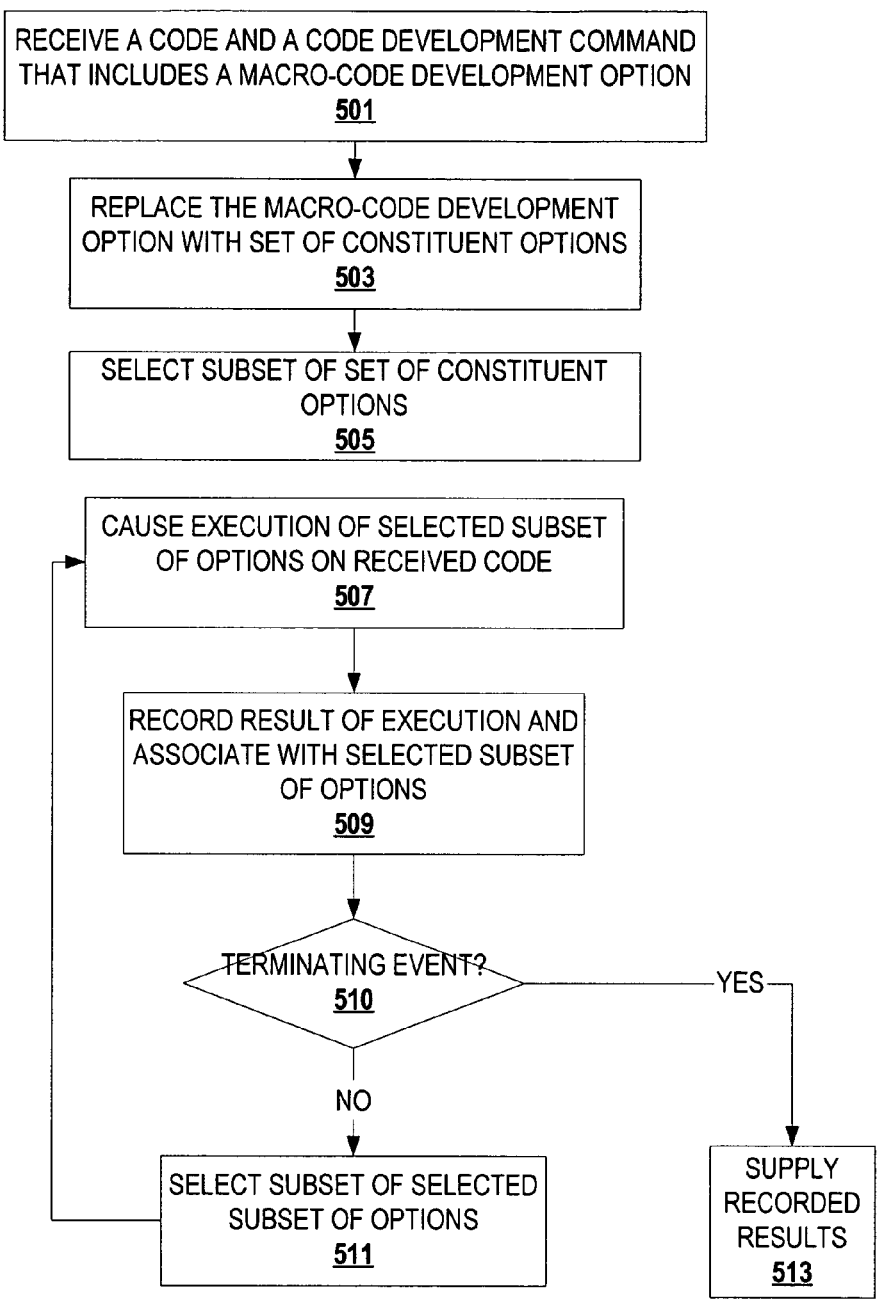
FIG. 5 depicts an example flowchart for failure analysis of a code and macro-code development options.

FIG. 5 depicts an example flowchart for failure analysis of a code and macro-code development options. At block 501, a code and a code development command that includes at least one macro-code development option is received. At block 503, the macro-code development option is replaced with a set of code development options that constitute the macro-code development option. At block 505, a subset of the set of code development options (being the constituent options and any other options that constitute the code development command) is selected. At block 507, the selected subset of code development options are caused to be executed on the received code. At block 509, a result of the execution is recorded and the recorded result is associated with the executed selected subset of code development options. At block 510, it is determined whether a terminating event is encountered, such as those described with reference to FIG. 3. If a terminating event is not encountered, then control flows to block 511. If a terminating event is encountered, then control flows to block 513.

At block 513, the recorded results and respective associated code development options are supplied, similar to block 311 of FIG. 3. At block 511, a subset of the selected subset of code development options is selected. Control flows from block 511 back to block 507.

Figure 6:
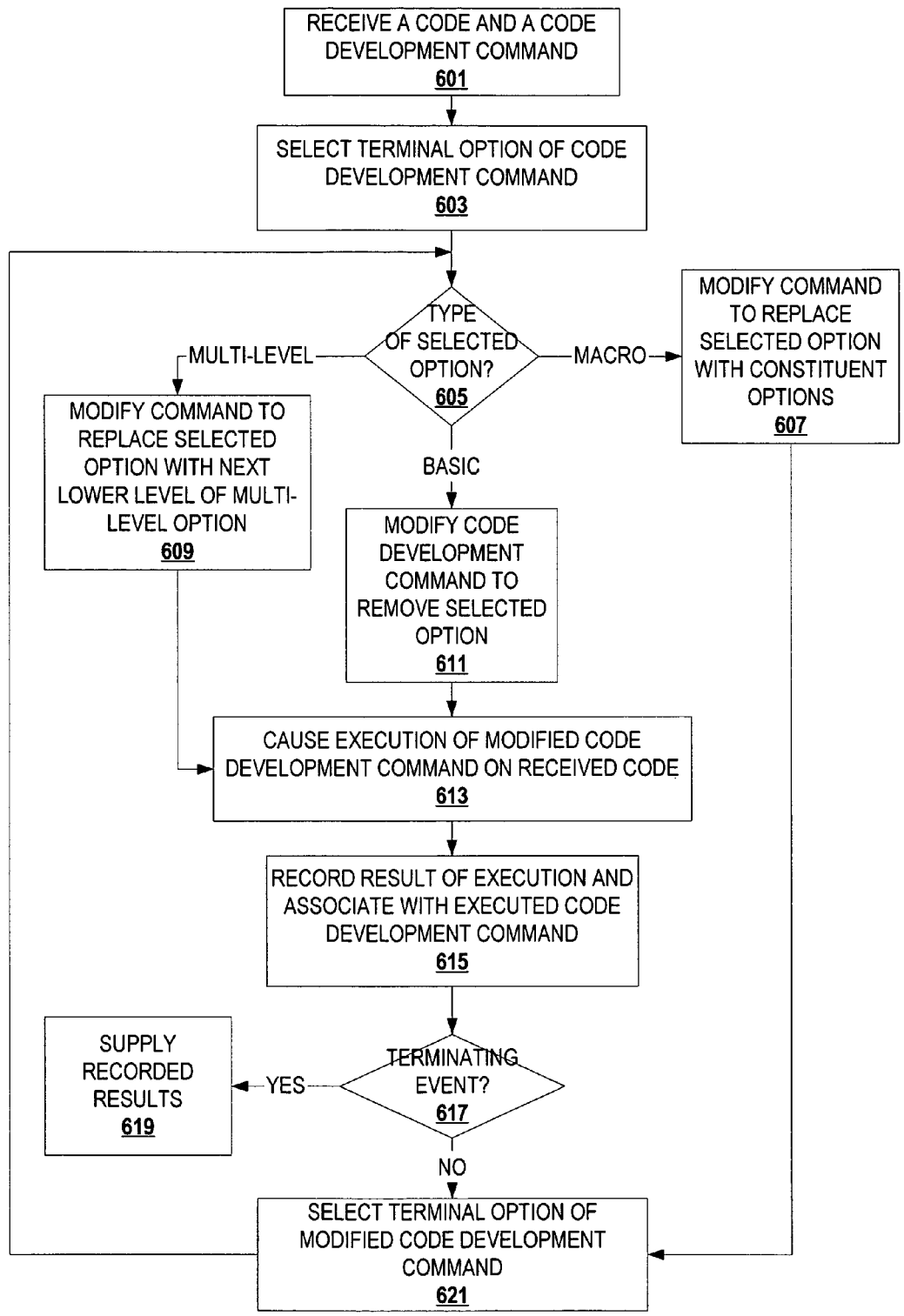
FIG. 6 depicts an example flowchart for analyzing a code development tool with various types of code development options.

FIG. 6 depicts an example flowchart for analyzing a code development tool with various types of code development options. At block 601, a code and a code development command are received. At block 603, a terminal option of the code development command is selected. The terminal option is the code development option that occurs last in the code development command. Embodiments may select options for examination and/or removal for failure analysis in accordance with any of a variety of guiding parameters (e.g., select the macro-option with the most constituent options, select the first option in the code development command, etc.). At block 605, the type of the selected code development option is determined. If the selected option is a multi-level option, then control flows to block 609. If the selected option is a macro-option, then control flows to block 607. If the selected option is a basic code development option (i.e., not a macro-option and not a multi-level option), then control flows to block 611.

At block 607, the code development command is modified to replace the selected option with its constituent code development options. Control flows from block 607 to block 621.

At block 609, the code development command is modified to replace the selected multi-level code development option with a next lower level of the multi-level code development option (e.g., −xO5 with −xO4 or −fsimple=2 with −fsimple=1). Control flows from block 609 to block 613.

At block 611, the code development command is modified to remove the selected basic code development option. At block 613, the modified code development command is caused to be executed on the received code. At block 615, result of the execution is recorded and associated with indication of the modified code development command. At block 617, it is determined whether a terminating event has occurred. If a terminating event has occurred, then control flows to block 619. If a terminating event has not occurred, then control flows to block 621.

At block 619, the recorded results are supplied (e.g., supplied to an application to be formatted; supplied to a server for transmission over a network, etc.).

At block 621, a terminal option of the modified code development command is selected. Control flows from block 621 to block 605.

It is more apparent with FIG. 6 that analyzing complex code development commands can become quite involved. With a failure analysis tool that automatically examines a code development command and executes subsets of code development options, a user need not expend resources, especially time, investigating problematic code development options nor sacrifice performance improvements available with code development options. A user can efficiently identify and isolate a set of one or more code development options, while still reaping the advantages offered by other code development options of a problematic code development command.

Automatic failure analysis can be applied to value range of code development options, as well as code development options. Some code development options are applied to code with a range of values for the code development option. Instead of discarding the code development option, the range of values can be examined to diagnose the problematic values of the range and find the threshold value that corresponds to a failure.

Threshold Search Failure Analysis

FIG. 7 depicts a web browser with example failure analysis results for threshold failure analysis. A web browser 700 indicates a table of results recorded from a threshold failure analysis. Seven rows of recorded results are indicated in the web browser 700 under four columns. A first column indicates an index for each row. A second column indicates a set of code development options, in this case compiler flags, that were executed on a code a.out. A third column indicates a status or result of the execution. A fourth column indicates a runtime for execution of the set of indicated compiler flags. A first row indicates compiler flags "−Wo, −max fg=87." Each subsequent row indicates the same set of code development options, with the exception of the value set for the flag 'fg.' The flag value goes through the following sequence: 131, 153, 142, 136, 133, and 132. Execution of a code development command with the values 0 through 87 resulted in a pass. When the range was extended to include values up to 153, then the result was a failure. Since a failure occurred, the failure analysis tool reduced the top of the range to 142. Each subsequent reduction in the top of the range resulted in a failure also. When the recorded results are examined, it can be discerned that failures begin with the value 132, since 131 passed.

Figure 8A:
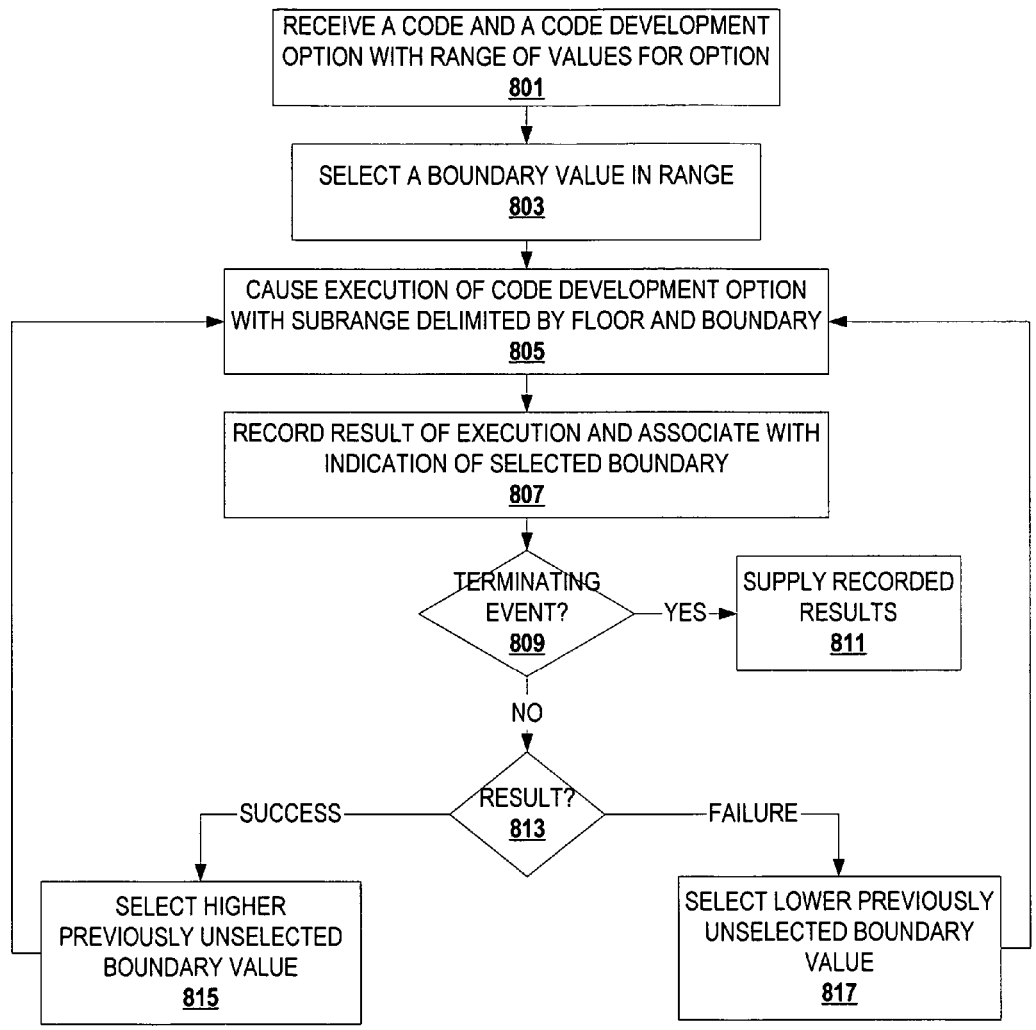
FIGS. 8A-8B depict example flowcharts for threshold failure analysis of a range of values for a code development option.
Figure 8B:
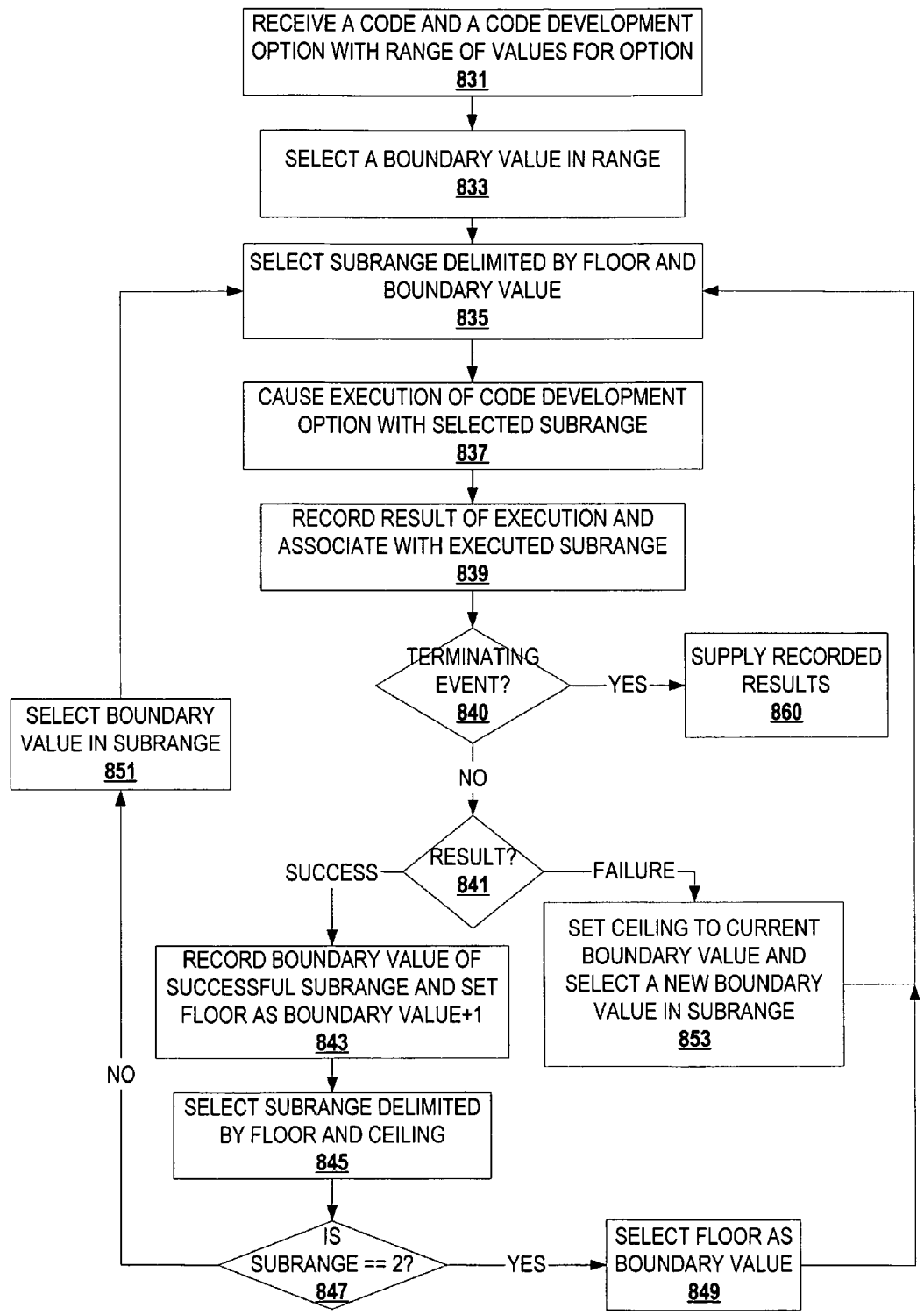

FIGS. 8A-8B depict example flowcharts for threshold failure analysis of a range of values for a code development option. FIG. 8A depicts an example flowchart for threshold failure analysis of an implicit range of values for a code development option. At block 801, a code and a code development option with a maximum value defining a value range for the code development option are received. As in FIG. 7, the lower boundary of the range may be implicit, with only the maximum value being specified. At block 803, a maximum boundary value in the range is selected. At block 805, the code development option with a range delimited by the selected maximum value (0−>selected boundary value, assuming that 0 is a valid value and defines the floor of the range) is caused to be executed on the received code. At block 807, result of the execution is recorded and associated with indication of the selected boundary value. At block 809, it is determined whether a terminating event has occurred (e.g., maximum number of runs, discovery of a threshold value between failing and passing execution). If a terminating event has occurred, then control flows to block 811. If a terminating event has not occurred, then control flows to block 813.

At block 811, the recorded results are supplied, for example, to an application for further analysis or formatting, to a web server for transmission, etc.

At block 813, it is determined whether execution was successful. If the execution was successful, then control flows to block 815. At block 815, a previously unselected value is selected that is higher than the currently selected value. Control flows from block 815 to block 805. If the execution was not successful, then control flows to block 817. At block 817, a previously unselected value that is lower than the currently selected value is selected. Selection of the values can be in accordance with a variety of search techniques, such as binary search.

FIG. 9 depicts a web browser with example recorded results of a threshold failure analysis for a specified subrange. A web browser 900 indicates seven rows of results. A first row indicates a value range delimited by 66 and 132 for a code development option −Wo. The option '−skip_fg=66' indicates that the values 0 through 66 should not be applied and that the values 67 through 132 should be applied. The range delimited by 66 and 132 are executed with success. The lower boundary is reduced to 33, resulting in success again. On the third run, the lower boundary has been reduced to 16 and results in a failure. The fourth run selects a lower boundary of 24, between the successful 33 and the failing 16. Successively increasing lower boundary values are selected between 16 and 33 until the seventh run results in success with selection of a lower boundary of 31.

FIG. 8B depicts an example flowchart for failure analysis of a specified subrange of values for a code development option. At block 831, a code and a code development option with a range of values for the code development option are received. At block 833, a boundary value in the value range is selected. At block 835, a subrange delimited by a floor of the value range and the selected boundary value is selected. At block 837, the code development option with the selected subrange is caused to be executed on the received code. At block 839, result of the execution is recorded and associated with indication of the selected subrange. At block 840, it is determined whether a terminating event has occurred. If a terminating event has occurred, then control flows to block 860. Example terminating events include the selected subrange being comprised of a single value, or any of the example terminating events described in the above Figures, such as FIG. 3. If a terminating event has not occurred, then control flows to block 841.

At block 860, recorded results are supplied to at least one of an application, another server, etc.

At block 841, the result of the execution is determined. If the execution was successful, then control flows to block 843. If the execution failed, then control flows to block 853.

At block 843, the boundary value of the successfully executed subrange is recorded and the floor is set to the boundary value +1. At block 845, the subrange delimited by the ceiling and the floor is selected. At block 847, it is determined whether the subrange has a size of two (i.e., whether the subrange only includes the ceiling and the floor). If the subrange has a size of two, then control flows to block 849. If the subrange has a size that is not two, then control flows to block 851.

At block 851, a boundary value in the selected subrange is selected. Control flows from block 851 to block 835.

At block 849, the floor is selected as a boundary value. Control flows from block 849 to block 835.

At block 853, the ceiling is set to the currently selected boundary value and a new boundary value is selected in the subrange delimited by the ceiling and the floor. Control flows from block 853 to block 835.

Module Search Failure Analysis

FIG. 10 depicts a web browser presenting example recorded results of module search failure analysis. A web browser 1000, indicates thirteen rows of module search failure analysis results. A first row represents a result of a first run of a module search failure analysis. The first row indicates a code development command "−xO4 −wO, −pec_keep, ATS/run/pass." A second row indicates a code development command "–fast –WO, –pec_keep, ATS/run/fail." These first two rows reflect execution of a successful command (the command indicated in the first row) on a code "dual.out" and execution of a failed code development command (the command indicated in the second row) on the code. The resulting code from the first command is saved to the path ATS/run/pass. The resulting code from the failing second command is saved to the path ATS/run/fail. For example, intermediate representations, such as the object files, generated from execution of the failed and the successful code development commands are saved to their respective paths. The command –pec_keep causes both successful and failed objects to be saved as illustrated. After the first two runs establish the failing objects and the successful objects, the subsequent runs recursively identify those modules that are incompatible with the failing code development option '–fast.' In the illustrated example, the subsequent runs utilize the options –xO4 and –WO. These options are employed to trigger a compiler to process the saved objects (e.g., linking of the objects) as directed by the use command. These particular passing options are not necessary, although users should be aware of options that affect object processing, such as options that optimize linking. In addition, it is not necessary to invoke a compiler. For example, a linker may be invoked directly on the saved objects as directed by the use command (or some other analogous command regardless of the moniker for the command). On the third run of module search failure analysis, the respective successful versions of modules 1 through 7 (i.e., the successful version of module 1, the successful version of module 2, etc.) are used and the respective failed versions of modules 8 through 14 are used. Since the result of using the failed versions of modules 8 through 14 was failure, the next successive run only used the failed versions of modules 11 through 14. The utilized failed versions of modules is gradually reduced to only the failed version of module 14, when success is achieved. After the successful run, the failed versions of modules 14 and 13 are used, which results in failure. At this point, it can be ascertained that module 13 is incompatible with the code development option –fast. Hence, the failed version of module 13 is no longer used. In run eight, the failed versions of all of the modules, with the exception of module 13, are used, which again results in failure. In run 9, the failed versions of modules 8-12 and 14 are used with the successful versions of modules 1-7 and 13. In run 10, the utilized failed versions of modules is again narrowed to modules 11-14, with the exception of module 13. In the final run 13, utilization of the failed versions of the modules 1-11 and 14 and of the successful versions of modules 12-13 meets with success. Review of these recorded results aids in the determination that –fast cannot successfully be applied to modules 12 and 13, but the code development option –fast can be employed for the benefit of modules 1-11 and 14. With the information provided from module search failure analysis, the option –fast does not have to be completely abandoned, and still can be applied to the majority of modules. This allows intelligent selective application of options to modules of a program.

Figure 11A:
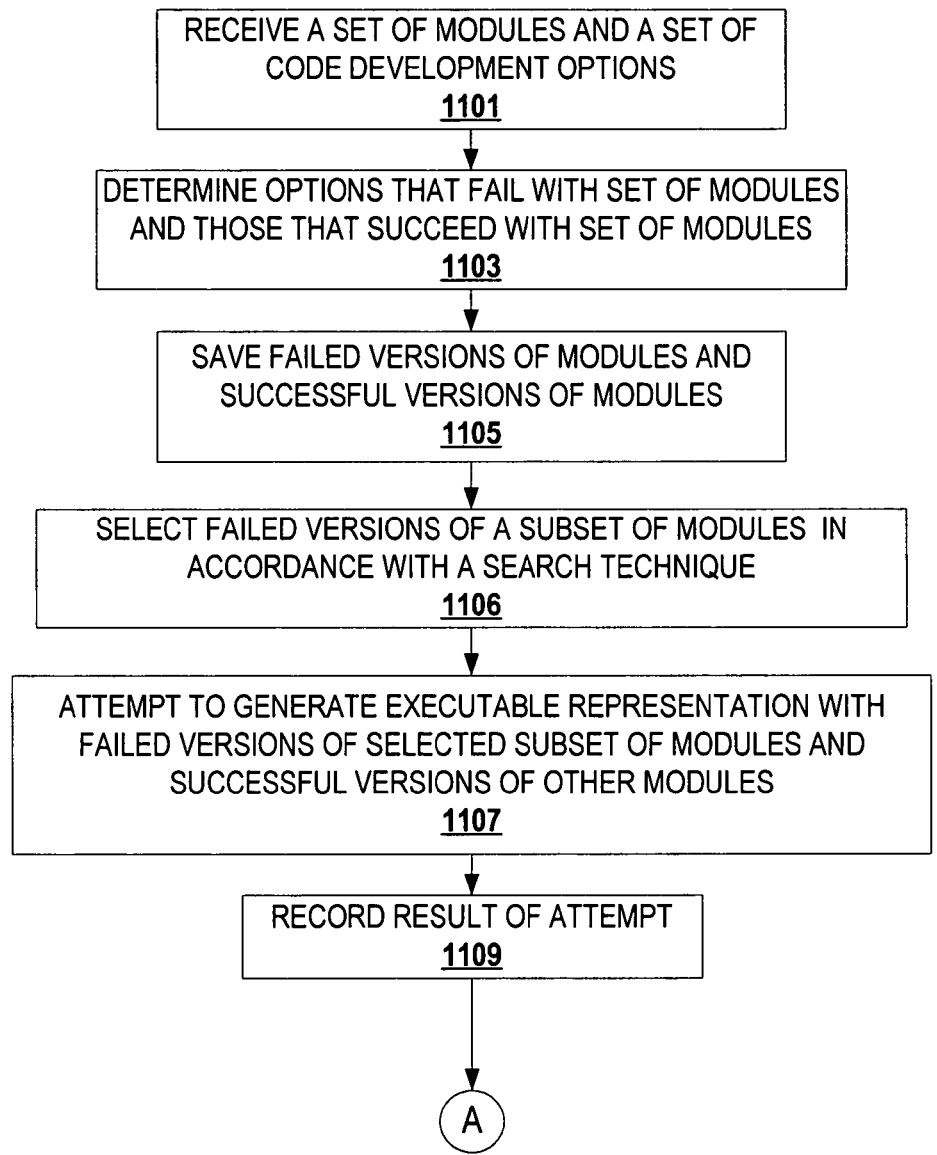
FIGS. 11A-11B depict an example flowchart for module search failure analysis.
Figure 11B:
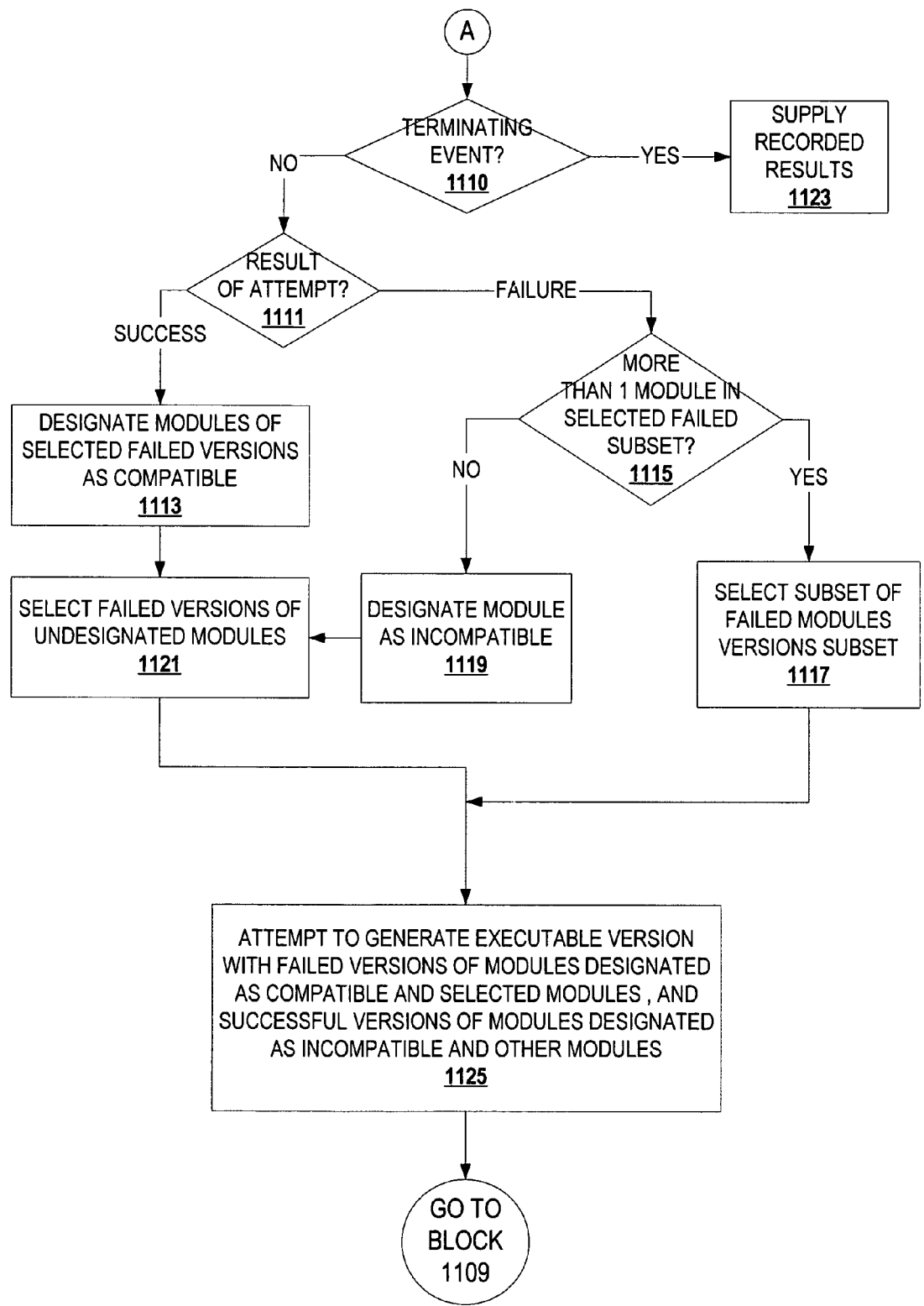

FIGS. 11A-11B depict an example flowchart for module search failure analysis. FIG. 11A depicts an example flowchart for module search failure analysis. At block 1101, a set of modules of a code and a set of code development options are received. At block 1103, those of the options that are incompatible with the set of modules (i.e., result in failure) and those options that are compatible with the set of modules are determined. At block 1105, failed versions of the modules and successful versions of the modules are saved (e.g., object files from execution of the failed code development option(s) are saved and object files from execution of the successful code development option(s) are saved). At block 1106, the failed versions of a subset of the set of modules is selected in accordance with a search technique (e.g., binary search). At block 1107, an attempt is made to generate an executable representation of the modules from the selected failed versions module subset and the successful versions of the other modules. At block 1109, result of the attempt is recorded and associated with indication of the modules (e.g., indication that failed versions of modules 1-5 and successful versions of modules 6-10 were used). Control flows from block 1109 to block 1110.

FIG. 11B depicts continuation of the example flowchart depicted in FIG. 11A. At block 1110, it is determined whether a terminating event is encountered (e.g., maximum number of runs, all modules have been searched, only one module remains undesignated with a failed version that has not been selected, etc.). If a terminating event has occurred, then control flows to block 1123. If a terminating event has not occurred, then control flows to block 1111.

At block 1111, it is determined whether the attempt to generate an executable representation was successful. If successful, then control flows to block 1113. If the attempt was not successful, then control flows to block 1115.

At block 1113, modules of the selected subset are designated as compatible. At block 1121, failed versions of undesignated modules are selected. Control flows from block 1121 to block 1125.

At block 1115, it is determined whether more than one module is in the selected failed versions module subset. If there is more than one module, then control flows to block 1117. If there is only one module, then control flows to block 1119.

At block 1117, failed versions of a subset of the selected failed versions module subset are selected. Control flows from block 1117 to block 1125.

At block 1119, the module is designated as incompatible. Control flows from block 1119 to block 1121.

At block 1125, an attempt is made to generate an executable representation of the modules with failed versions of modules designated as compatible and failed versions of selected modules, and with successful versions of modules designated as incompatible and successful versions of those modules that remain (i.e., those modules that are not designated and that are not in the failed modules versions subset). Control flows from block 1125 back to block 1109. The information garnered from module search failure analysis allows efficient application of options with optimization of returns. In addition, developers can economically focus resources on modules identified with module search failure analysis to possibly modify those modules that are incompatible with the options, or at least investigate the incompatibility. Investigation of the incompatibility would be further advanced with identification of the differences between the successful version and the failed version of a module. With module search failure analysis, the different versions can be stored and their differences identified with a tool, such as diff, diff2, cmp, etc.

FIG. 12 depicts an example decomposition of two versions of a portion of a module. In FIG. 12, several lines of different versions of a module are displayed. A differential identify tool inserts characters to indicate lines that exist in both versions but are different, and lines that only exist in one version. The lines with fcmpes, fmovsg, and fstod occur in both versions, but utilize different registers. Subsequent to these different lines, the version represented in the right column of FIG. 12 includes 4 lines that are not present in the version represented in the left column. Likewise, there are lines present in the version of the module in the left column, which are not present in the version represented in the right column. These identified differences can aid developers to investigate the potential causes for incompatibility between a module and a code development option.

The various failure analysis techniques (automatic code development option failure analysis, module search, threshold search, etc.) can all be provided collectively or separately via the Web, such as in the example depicted in FIGS. 13A-13B. Although the examples illustrated in the Figures indicate mark-up language encodings (e.g., HTML), indications of failure analysis results, including modules, code development options, etc., can also be indicated with embedded objects. Furthermore, the failure techniques can be employed in conjunction with automatic code tuning. For example, the code development options executed on a code for code tuning are fed directly into a failure analysis tool, which analyzes the code with those of the code development options that failed.

The described embodiments may be provided as a computer program product, or software, that may include a machine-readable medium having stored thereon instructions, which may be used to program a computer system (or other electronic devices) to perform functionality according to the described embodiments. A machine readable medium includes any mechanism for storing information in a form (e.g., software, processing application) readable by a machine (e.g., a computer). The machine-readable medium may include, but is not limited to, magnetic storage medium (e.g., hard disk drive); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 14:
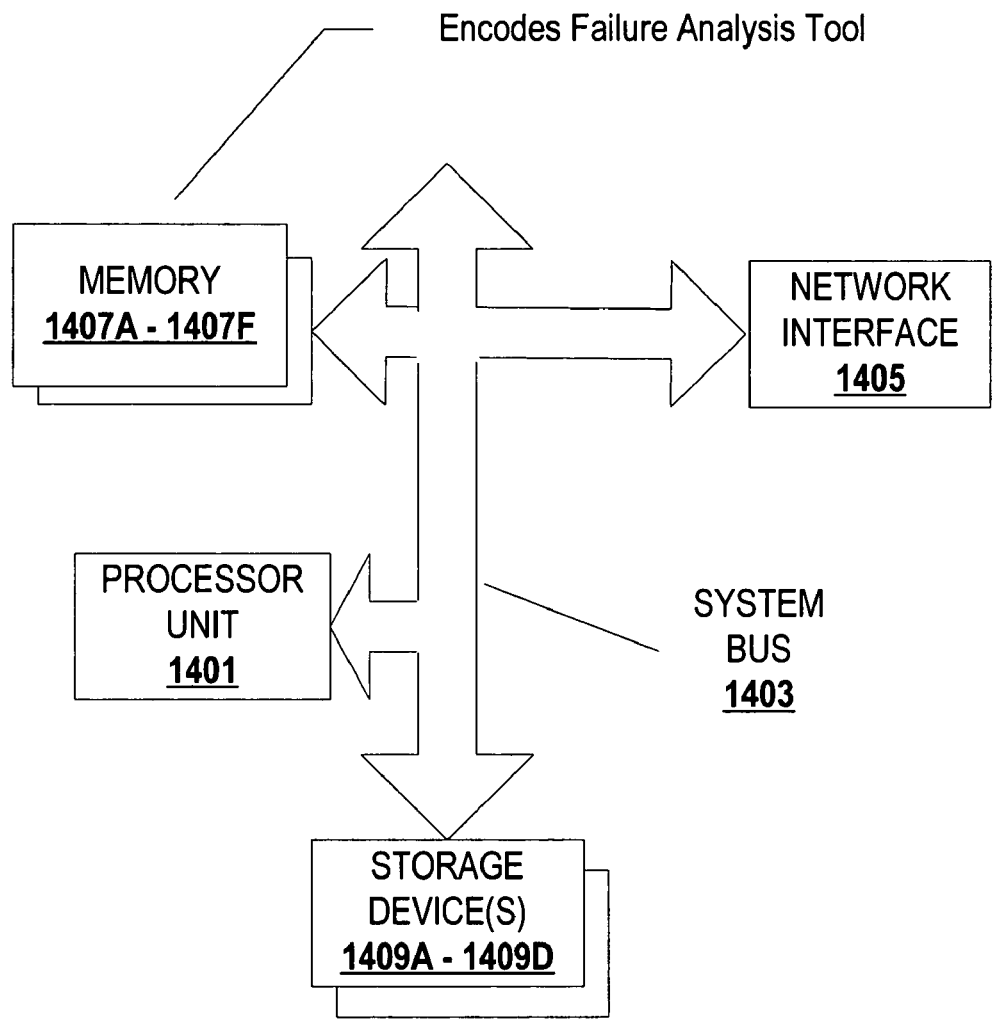
FIG. 14 depicts an exemplary computer system.

FIG. 14 depicts an exemplary computer system. A computer system includes a processor unit 1401 (possibly including multiple processors, multiple cores, etc.). The computer system also includes a memory 1407A-1407F (e.g., one or more of cache, SRAM DRAM, RDRAM, EDO RAM, DDR RAM, EEPROM, etc.), a system bus 1403 (e.g., LDT, PCI, ISA, PCI Express, etc.), a network interface 1405 (e.g., an ATM interface, an Ethernet interface, a Frame Relay interface, etc.), and a storage device(s) 1409A-1409D (e.g., optical storage, magnetic storage, etc.). Embodiments may include fewer or additional components not illustrated in FIG. 14 (e.g., video cards, audio cards, additional network interfaces, peripheral devices, etc.). The processor unit 1401, the storage device(s) 1409A-1409D, the network interface 1405, and the main memory 1407A-1407F are coupled to the system bus 1403. The memory 1407A-1407F embody a failure analysis tool in accordance with described embodiments. It should be understood that the system depicted in FIG. 14 is only an example. A failure analysis tool may be embodied as a co-processor, in the storage device(s) 1409A-1409B, etc.

While embodiments have been described with reference to various realizations, it will be understood that these realizations are illustrative and that the scope is not limited to them. Many variations, modifications, additions, and improvements are possible.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A failure analysis apparatus, comprising:
a first set of instructions, embodied in a machine-readable storage medium and executable by at least one processing unit, that iteratively modifies a failed code development command to generate modified versions of the failed code development command until a terminating event is encountered;
the failed code development command resulted in a failure when executed on a given code;
the failed code development command comprising a set of one or more code development options and each modified version includes a subset of the set of one or more code development options;
the failed code development command further comprising a command entered into a code development tool to cause the code development tool to perform at least one task on the given code;
the terminating event comprising of a combination of: reaching an analysis limit and reaching a final subset of the set of one or more code development options, wherein the analysis limit is assigned a weight and wherein the reaching of the final subset of the set of one or more code development options is assigned another weight;
wherein each modified version comprises at least one of:
removal of at least one of the set of one or more code development options,
replacing a multiple level one of the set of one or more code development options with a different level of the multiple level code development option, or
replacing a macro one of the set of one or more code development options with a subset of constituent options thereof;
a second set of instructions, embodied in the machine-readable storage medium and executable by the at least one processing unit, that executes each modified version of the failed code development command on the given code; and
a third set of instructions, embodied in the machine-readable storage medium and executable by the at least one processing unit, that records results of the execution of each modified version of the failed code development command to indicate at least one code development option of the set of one or more code development options that is not compatible with the given code.

2. The failure analysis apparatus of claim 1, wherein the failure analysis apparatus is accessible over a network.

3. The failure analysis apparatus of claim 1, wherein the set of one or more code development options comprise at least one of compiler options and optimization flags.

4. The failure analysis apparatus of claim 1, wherein the set of one or more code development options and the given code are received over a network.

5. The failure analysis apparatus of claim 1 further comprising:
a fourth set of instructions, embodied in the machine-readable storage medium and executable by the at least one processing unit, that generate a web-based user interface to accept input of the given code and the set of code development options.

6. A method of diagnosing failure in a code development environment comprising:

iteratively deriving, utilizing at least one processing unit, a plurality of code development commands from a failed code development command until a terminating event is encountered;

the failed code development command failed to execute on a given code the failed code development command comprising a set of code development options, each of the plurality of code development commands comprising a subset of the set of code development options;

the failed code development command further comprising a command entered into a code development tool to cause the code development tool to perform at least one task on the given code;

the terminating event comprising a combination of: reaching an analysis limit and reaching a final subset of the set of code development options, wherein the analysis limit is assigned a weight and the reaching of the final subset of the set of one or more code development options is assigned another weight;

wherein each derivation comprises at least one of:

removal of at least one of the set of one or more code development options, replacing a multiple level one of the set of one or more code development options with a different level of the multiple level code development option, or replacing a macro one of the set of one or more code development options with a subset of constituent options thereof;

executing each of the derived plurality of code development commands on the given code utilizing the at least one processing unit; and recording results of executing the derived plurality of code development commands on the given code in a machine-readable storage media to indicate at least one code development option of the set of code development options that is not compatible with the given code.

7. The method of claim 6 further comprising supplying the recorded results for at least one of further analysis, formatting, presentation, and transmission over a network.

8. The method of claim 7 further comprising supplying access to a version of the given code generated from execution of at least one of the plurality of derived code development commands.

9. The method of claim 6, wherein the failed code development command comprises at least one of optimization flags and compiler options.

10. The method of claim 6 embodied as a computer program product, encoded on one or more machine-readable storage media.

11. The method of claim 10, wherein the computer program embodiment of the method is deployed on at least one of a server farm, a grid, and a web server.

12. The method of claim 6 further comprising associating each of the recorded results with respective indications of the plurality of derived code development commands.

13. An apparatus comprising:

a processor unit communicably connected to at least one machine-readable storage medium;

a first set of instructions, stored in the at least one machine-readable storage medium, executable by the processor unit to iteratively modify a failed code development command until a terminating event is encountered;

the failed code development command comprising a set of code development options that fail when collectively executed on a given code;

each modified code development command comprising a subset of the set of code development options;

the code development command further comprising a command entered into a code development tool to cause the code development tool to perform at least one task on the given code;

the terminating event comprising a combination of reaching an analysis limit and reaching a final subset of the set of code development options, wherein the analysis limit is assigned a weight and the reaching of the final subset of the set of one or more code development options is assigned another weight;

wherein each modification comprises at least one of:

removal of at least one of the set of one or more code development options, replacing a multiple level one of the set of one or more code development options with a different level of the multiple level code development option, or replacing a macro one of the set of one or more code development options with a subset of constituent options thereof; and a second set of instructions, stored in the at least one machine-readable storage media, executable by the processor unit to execute each modified development command on the given code to diagnose at least one code development option of the set of code development options that is incompatible with the given code.

14. The apparatus of claim 13, further comprising:

a third set of instructions, stored in the at least one machine-readable storage media, executable by the processor unit to record results of the execution of the second set of instructions.

15. The apparatus of claim 14, further comprising:

a fourth set of instructions, stored in the at least one machine-readable storage media, executable by the processor unit to supply the recorded results over a network.

\* \* \* \* \*